United States Patent [19]

Hoffman et al.

[11] Patent Number: 5,468,140
[45] Date of Patent: Nov. 21, 1995

[54] TAPERED AIRSLEEVE CURING PRESS

[75] Inventors: Keith E. Hoffman, Atlanta; Robert F. Elliott, Westfield; David J. Mickler, Anderson, all of Ind.

[73] Assignee: Bridgestone/Firestone, Inc., Akron, Ohio

[21] Appl. No.: 861,671

[22] Filed: Apr. 1, 1992

[51] Int. Cl.⁶ .................................................. B29C 35/00
[52] U.S. Cl. ........................... 425/389; 249/65; 264/314; 425/393
[58] Field of Search ............................... 249/65; 264/314; 425/39, 40, 42, 48, 49, 50, 51, 52, 195, 389, 393, 405.1, DIG. 14, DIG. 19, DIG. 44

[56] References Cited

U.S. PATENT DOCUMENTS

| | | | |
|---|---|---|---|
| 2,671,244 | 3/1954 | Freedlander | 425/389 |
| 2,737,998 | 3/1956 | Meanor et al. | 154/1.8 |
| 2,838,796 | 6/1958 | Reed | 425/DIG. 19 |
| 3,057,768 | 10/1962 | McGough | 156/202 |
| 3,085,287 | 4/1963 | Wach | 425/40 |
| 3,245,648 | 4/1966 | Johansson et al. | 425/DIG. 44 |
| 3,360,826 | 1/1968 | Lorang | 425/393 |
| 3,398,218 | 8/1968 | Richmond | 425/39 |
| 3,659,976 | 5/1972 | Yavorsky et al. | 425/42 |
| 3,850,559 | 11/1974 | Mintz et al. | 425/DIG. 44 |
| 3,964,846 | 6/1976 | Bliss | 425/28 B |
| 4,126,659 | 11/1978 | Blad | 264/90 |
| 4,184,822 | 1/1980 | Schwabauer | 425/50 |
| 4,252,760 | 2/1981 | Foster et al. | 264/120 |
| 4,263,237 | 4/1981 | Weeden et al. | 264/219 |
| 4,496,299 | 1/1985 | Pettersson | 425/405 H |
| 4,704,082 | 11/1987 | Buhler et al. | 425/405 H |
| 4,888,144 | 12/1989 | Matsushitaeta | 264/120 |
| 4,937,025 | 6/1990 | Foster et al. | 264/120 |
| 4,997,511 | 3/1991 | Newsom | 156/382 |
| 5,062,780 | 11/1991 | Nakagaki | 425/39 |

FOREIGN PATENT DOCUMENTS

| | | | |
|---|---|---|---|
| 62-201208 | 9/1987 | Japan | 425/393 |
| 437357 | 3/1985 | U.S.S.R. | 425/52 |
| 2139934 | 11/1984 | United Kingdom . | |

*Primary Examiner*—C. Scott Bushey
*Attorney, Agent, or Firm*—David A. Thomas

[57] ABSTRACT

An apparatus for curing a tapered airsleeve has a bladder curing chamber into which a rigid tapered sleeve cartridge is inserted to form the airsleeve thereon. The bladder curing chamber is formed by a rigid bladder support tube positioned between upper and lower plates and joined by strain rods. A straight cylindrical bladder is positioned within the bladder support tube and the ends are sealed by flipping them from the inside of the bladder support tube 180° over each end of the tube for sealing the curing chamber. The hollow tapered sleeve mold or cartridge is inserted into the bladder curing chamber and will be dimensionally similar to the airsleeve to be molded therein. A preshaped uncured green sleeve is positioned over the tapered sleeve cartridge before inserting it into the curing chamber. The straight cylindrical bladder is inflated and expands radially outwardly causing the uncured sleeve to conform against the tapered sleeve cartridge. A mixture of steam and air enters the interior of the support tube through an inlet port for expanding the bladder toward the sleeve cartridge, and together with a heated fluid injected into the hollow interior of the cartridge, cures the tapered sleeve.

9 Claims, 6 Drawing Sheets

TAPERED AIRSLEEVE CURING PRESS

BACKGROUND OF THE INVENTION

1. Technical Field

The invention relates to curing presses and in particular to a curing press and method for forming tapered airsleeves. More particularly, the invention relates to such a curing press and method which utilizes a straight cylindrical bladder for curing a preshaped airsleeve against a tapered cartridge located within a curing chamber.

2. Background Information

Airsleeves are used for a variety of shock absorbing purposes such as in vehicle suspension systems, and suspension system for other structural components such as presses, seats, etc. intended to absorb shock. Airsleeves also are used as elevation adjusting devices between a fixed member and a movable member in various pieces of apparatus and equipment. These airsleeves consist of a cured elastomeric bladder or bellow which may or may not contain reinforcing fiber or fabric, which is sealed against an end plate and/or a piston and pressurized with a fluid contained within a fluid chamber for absorbing shock imparted to either the end plate and/or piston.

These airsleeves may be cylindrical or tapered or have other configurations, and are formed by various curing methods. One method of curing a tapered airsleeve is to slide a preform or preshaped uncured green sleeve into a hollow contoured mold and then insert a correspondingly specially contoured bladder into the green sleeve and thereafter expanding the contoured bladder and subsequently the green sleeve, radially outwardly against a contour mold for forming the same. Although this curing press and procedure is satisfactory, it requires the use of specially contoured expansion bladders which are relatively expensive and which have a relatively short life requiring continual replacement after a predetermined number of airsleeves are produced thereby.

Examples of known prior art cure presses and methods for forming airsleeves and other elastomeric members are shown in the following patents.

U.S. Pat. No. 3,057,768 discloses a method of forming an air spring wherein the uncured sleeve is pressed outwardly against a static outer mold by means of an inner expandable mandrel.

U.S. Pat. No. 3,964,846 discloses an apparatus for the manufacture of power transmission belts in which the belt body or sleeve is sandwiched between radially expandable and radially contractible members in a vulcanizing chamber. Outward radial pressure is first applied to the belt body and then a radial inwardly pressure is applied together with heat, to cure the body within the chamber.

U.S. Pat. No. 4,126,659 discloses a method and apparatus for making a hollow resin impregnated fibrous article wherein a layup of the article to be manufactured is placed within a female mold and is forced against the interior of the mold, afterwhich and heat is applied to cure the resin.

U.S. Pat. No. 4,252,760 discloses a method and apparatus utilized to make articles from thermosetting plastics by means of pressing and sintering. A central mandrel has positioned therearound a backing member. Core members have positioned on their interior a pair of bladders which are used to press by fluid means, powdered material toward the backing member to form the desired product. Upon finishing the pressing procedure, the freshly compressed material is removed from the mandrel and the backing member which is frangible, is destroyed, rendering the compressed article in a state such that it may undergo the centering procedure. For the next pressing procedure a new backing material which is made of plaster, must be formed.

U.S. Pat. No. 4,263,237 discloses a method of molding an article using both inward and downward forces. An elastic material is expanded by fluid means to cause inward pressure against granular material that is positioned in a cavity which will be forced against a central mandrel. A ram with a closure member, also is utilized to create downward pressure.

U.S. Pat. No. 4,496,299 discloses the use of a molding tool for semi-isostatic compacting of powder. A mold cavity is positioned between a central steel core and an elastomeric jacket. Hydraulic fluid is positioned within a space to provide the medium for the elastomeric jacket to press the powder material within the mold cavity against the central steel core.

U.S. Pat. No. 4,704,082 discloses an isostatic press mold that uses a resilient outer member to apply pressure to powdery material forcing it against an inner mandrel to form the desired product. The powdered ceramic material is positioned in the mold cavity and is formed between the core mold parts and a pressed diaphragm. Fluid material causes a covering diaphragm to displace the pressed diaphragm toward the mold cavity. The covering diaphragm appears to be positioned around the ends of a rigid tube and a cover with a corresponding cover gasket, is used to seal the chamber.

U.S. Pat. No. 4,888,144 discloses a method for pressing dry type rubber. A flexible mold presses powder inwardly against a core member, and a pressure tube has its end portions positioned around both ends of the inner tube.

U.S. Pat. No. 4,937,025 discloses an apparatus and method for molding articles from particulate material, wherein the material is positioned between a central mandrel and an elastomeric bladders that may be pressed inwardly at a variety of points around the mandrel.

U.S. Pat. No. 4,997,511 discloses the use of a tubular autoclave for forming composite parts by applying pressure to a workpiece and then later subjecting the workpiece to heat. A workpiece which consists of a central mandrel that has layers of thermoplastic resin applied thereon, is positioned within a resilient sleeve which is inflated, causing pressure against the layers of thermoplastic resin that are positioned on the workpiece. The autoclave has covers which are secured by clamping means to form a fluid tight chamber.

U.K. Patent Application 2 139 934 discloses a press for forming contoured sheet material such as aromatic polymer composites, by pressing the sheet material between rigid contoured tools and a complementary contoured semi-rigid diaphragm. The diaphragm is thrust against the sheet material and the tool by fluid pressure in a manner to cause the sheet material to conform to the tool.

Although the above known prior art patents disclose various types of curing presses for forming airsleeves and other elastomeric and metal articles, they do not disclose the particular curing press and method of the present invention set forth in greater detail below and defined in the appended claims.

SUMMARY OF THE INVENTION

Objectives of the invention include providing a tapered airsleeve curing press utilizing straight cylindrical bladders resulting in a mold which is substantially simplified and less expensive than heretofore presses using tapered or specially contoured molding bladders.

Another objective is to provide such a curing press for forming tapered airsleeves which utilizes an externally located curing bladder which is expanded generally radially inwardly to press a preshaped uncured airsleeve against a specially contoured and tapered rigid curing cartridge.

A still further objective of the invention is to provide such a curing press utilizing upper and lower bladder radius fixtures to present pinching of the bladder when it is inflated, and in which bladder radius rings are provided on the ends of a bladder support tube around which the open ends of the bladder are turned 180° for providing an airtight seal to the bladder, and to prevent harmful pinching of the outturned bladder ends.

A still further objective of the invention is to provide such a curing press in which the preshaped uncured sleeve is installed over a rigid sleeve cartridge and inserted into the curing chamber either from above or below; and in which quick disconnect steam-air couplings are installed to inlet and outlet ports communicating with the bladder chamber and with the sleeve cartridge for applying steam into the cartridge and bladder chambers for pressing the sleeve against the preformed cartridge and for curing the same.

Another objective is to provide such a curing press in which a safety stop bar secures the sleeve cartridge within the curing chamber and firmly locks the cartridge in position when subjected to the pressurized curing fluid and pressure.

A further objective of the invention is to provide an improved method for curing tapered airsleeves in an efficient satisfactory manner with a minimum number of components, easier and less expensive than heretofore provided for producing cured tapered airsleeves.

These objectives and advantages are obtained by the apparatus of the present invention for curing a tapered elastomeric airsleeve, the general nature of which may be stated as including a top plate and a base; a hollow support tube having top and bottom opposite open ends mounted between the top plate and base; a cylindrical elastomeric bladder mounted inside said tube with corresponding top and bottom open ends forming an annular expansion chamber between said bladder and said tube; means for sealing the open ends of the bladder with respect to the top plate and base to form a separate internal curing chamber within the expansion chamber; a tapered sleeve cartridge located within the curing chamber for slidably receiving a similarly tapered preshaped elastomeric airsleeve thereon; and means for introducing a heated fluid into the expansion chamber to expand the bladder generally radially inwardly toward the sleeve cartridge to conform and cure the tapered sleeve against the contour of said sleeve cartridge.

These objectives and advantages are further obtained by the improved method of the present invention, the general nature of which may be stated as a method for curing a tapered elastomeric airsleeve including the steps of providing an uncured preshaped elastomeric airsleeve generally complementary to the contour of the cured airsleeve; providing a rigid annular body having a hollow interior; positioning a cylindrical expandable bladder having a hollow interior within the interior of the annular body to form an annular expansion chamber between the bladder and rigid body; providing a rigid tapered sleeve cartridge contoured to match the desired contour of the cured tapered airsleeve; sliding the uncured preshaped tapered airsleeve on the sleeve cartridge; placing the uncured sleeve and cartridge into the hollow interior of the expandable bladder forming an annular curing chamber between said bladder and cartridge; and introducing a heated pressurized fluid into the expansion chamber to expand the bladder inwardly to press the bladder against the uncured airsleeve and cartridge for subsequently curing said airsleeve into its final shape matching the shape of said cartridge.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
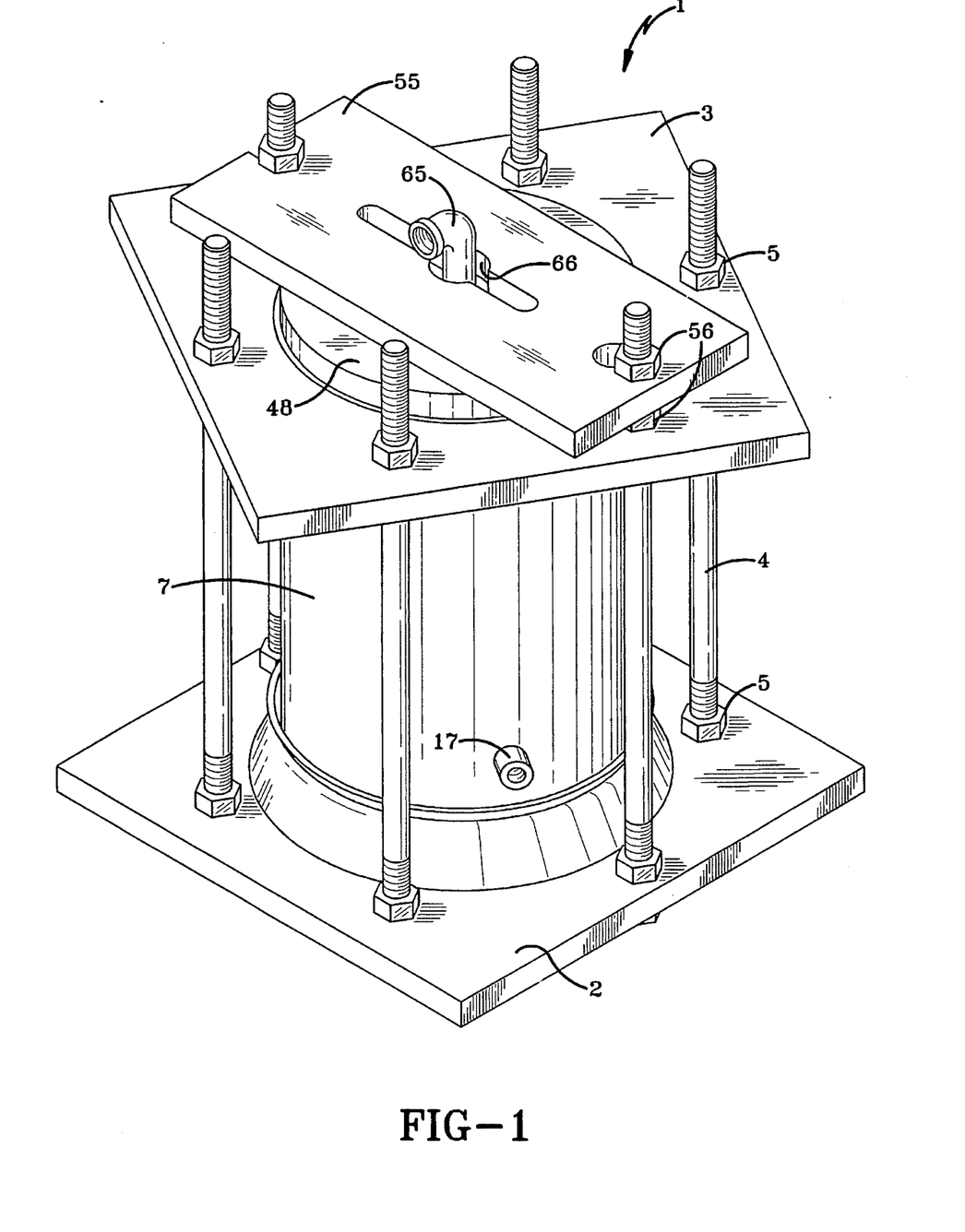
FIG. 1 is a perspective view of the curing press of the invention in a closed curing position.

The curing press of the present invention is indicated generally at 1, and is shown in assembled closed curing position in FIG. 1. Press 1 includes a lower base plate 2 and a top closure plate 3 which are secured together by a plurality of circularly arranged strain rods 4 which are connected to the respective plates by pairs of nuts 5.

A cylindrical hollow support tube 7 preferably formed of steel or other rigid material, has an upper and lower bladder radius ring 8 and 9 (FIGS. 2–4) located at the open ends 10 and 11 of tube 7. Radius rings 8 and 9 are similar with each having a stepped annular shoulder 12 formed therein, into which is seated the edges of support tubes 7. Rings 8 and 9 further include a flat end plate contacting surface 13 which terminates in curved ends 14, the purpose of which are described in greater detail below.

A pair of quick connect couplers 16 and 17 are mounted on support tube 7 for providing an inlet and outlet steam/air port respectively, communicating with hollow interior 18 of support tube 7.

In accordance with one of the features of the invention, a cylindrical elastomeric bladder 20 formed of a relatively heavy gauge of rubber, is located within the hollow interior of tube 7. Bladder 20 has its open ends 22 thereof, turned from the inside of bladder support tube 7 180° over and around each of the bladder radius rings 8 and 9, and secured against the outer surface of support tube 7 by annular clamp rings 23. Curved ends 14 and flat contact surfaces 13 of radius rings 8 and 9 prevent pinching and cutting of elastomeric bladder 20 when plates 2 and 3 are tightly clamped thereagainst, as shown particularly in FIG. 2 by advancement of nuts 5 along the threaded ends of strain rods 4, in order to provide a sealed hollow interior 24 for bladder 20. Bladder 20 forms an annular expansion chamber 26 (FIG. 4) between the bladder and inside cylindrical surface of tube 7.

In further accordance with another feature of the invention, a tapered sleeve cartridge indicated generally at 28 preferably formed of a rigid steel or aluminum material is adapted to be slidably mounted within hollow interior 24 of bladder 20 for curing a preshaped, uncured, tapered elastomeric airsleeve 29 (FIG. 3), which is slidably mounted thereon, as described in further detail below. Cartridge 28 (FIGS. 6 and 8) preferably has a cylindrical upper portion 30 and an intermediate inwardly tapered conical portion 31 which terminates in a bottom cylindrical portion 32. Cartridge 28 terminates in an upper open end 33 and an open bottom end 34 and has a hollow interior 53.

The terms top and bottom and upper and lower used throughout, refer to the position as shown in the drawings of the present disclosure representing curing press 1. However, curing press 1 need not assume the exact orientation as shown in the drawings but could be placed with its vertical axis 35 (FIG. 2) in a horizontal direction or completely reversed 180° wherein tapered cartridge 28 is inverted from that as shown in the drawings without affecting the concept of the invention.

Figure 2:
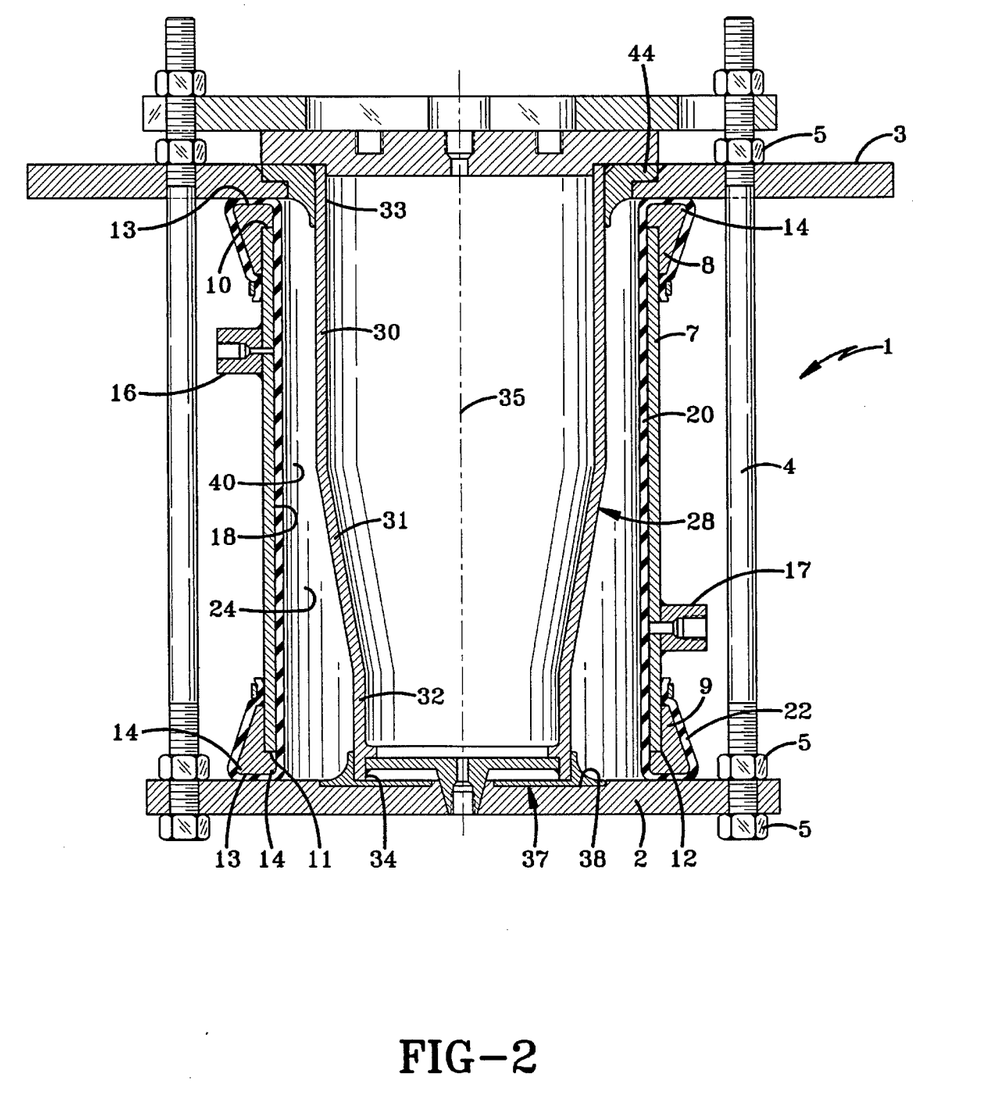
FIG. 2 is a cross sectional view of the curing press of FIG. 1 prior to the placement of a precured airsleeve therein.
Figure 3:
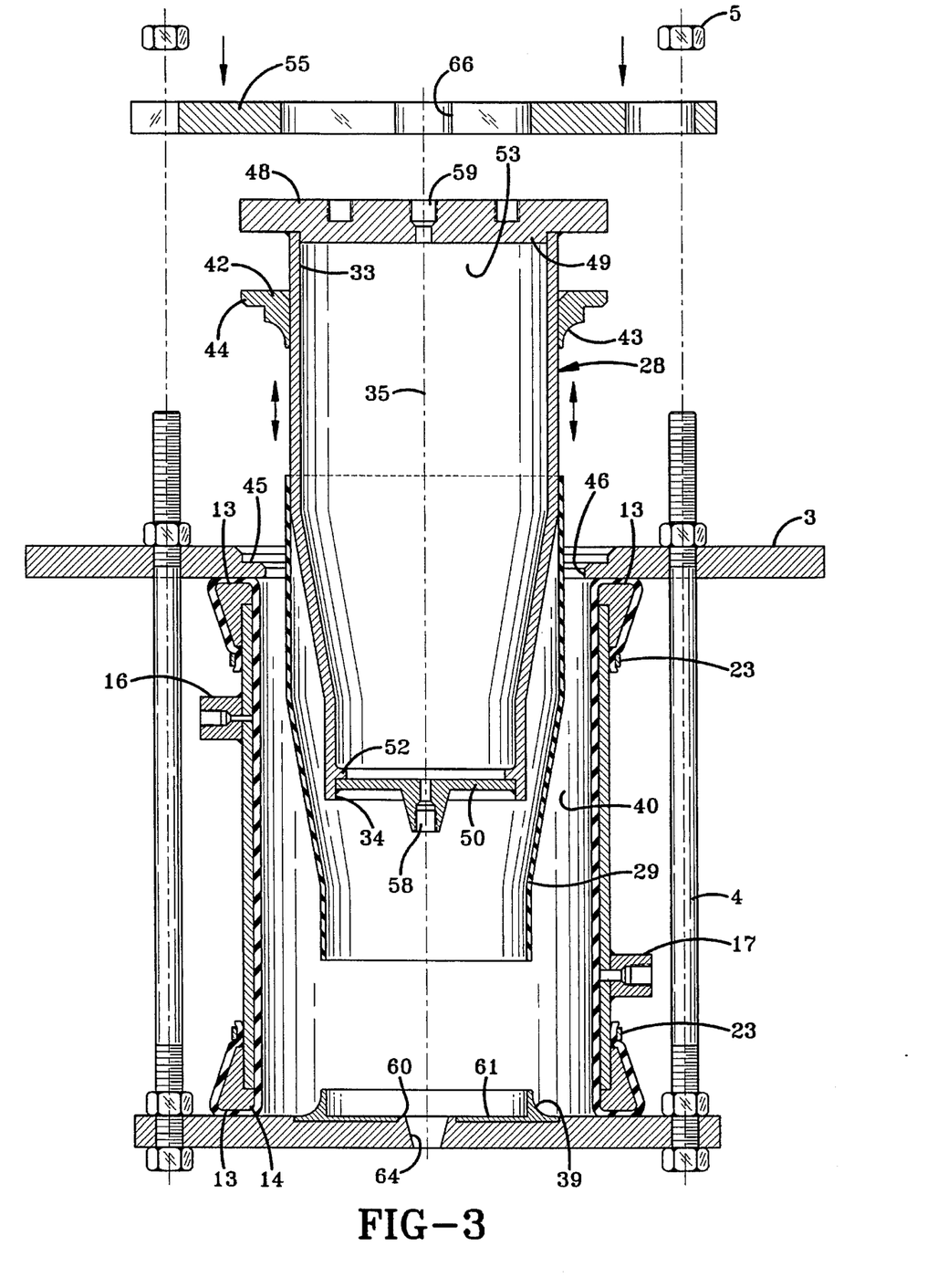
FIG. 3 is an exploded sectional view similar to FIG. 2, showing the sleeve cartridge and a preshaped green airsleeve being inserted into the curing chamber.
Figure 4:
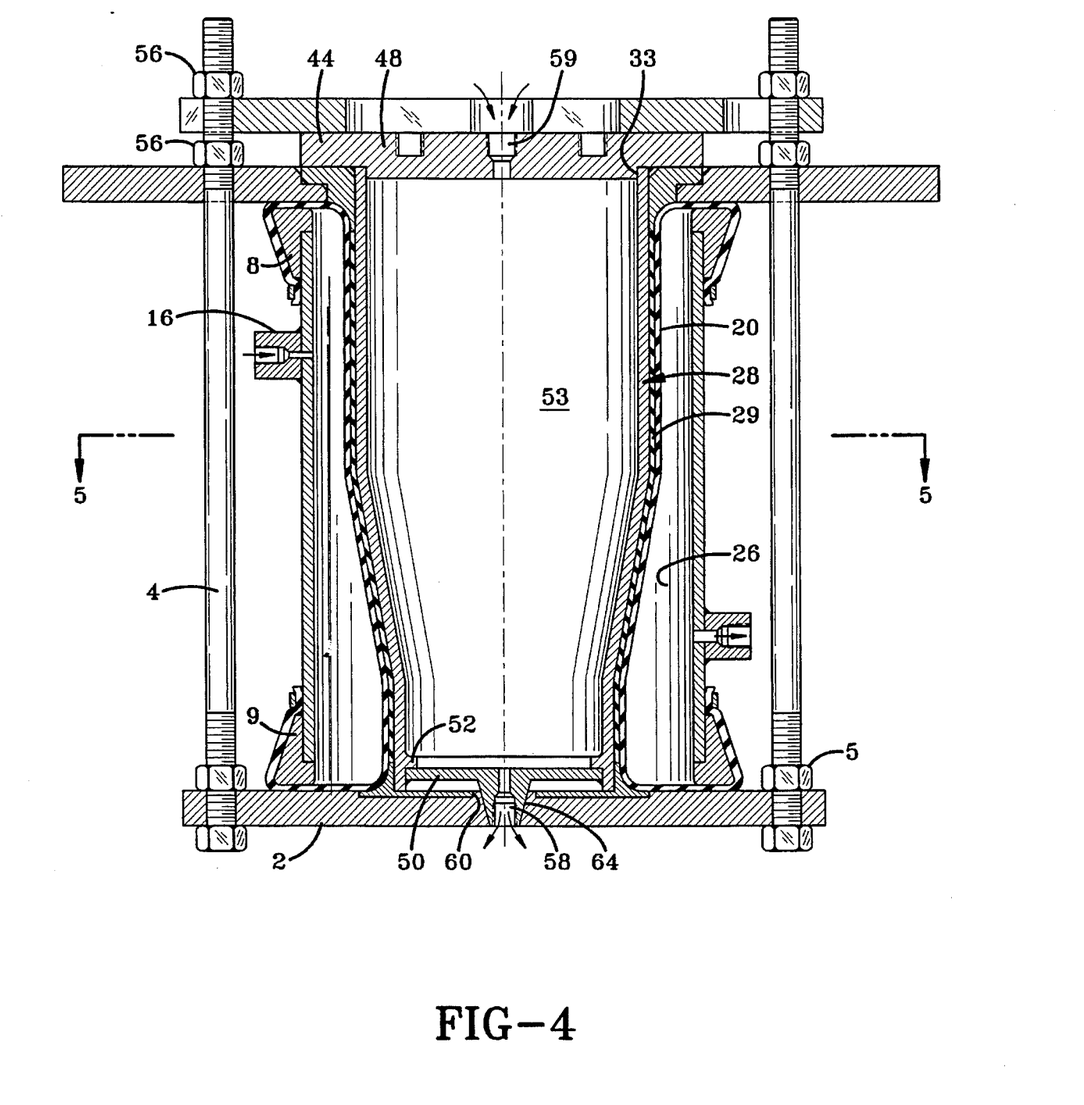
FIG. 4 is a sectional view similar to FIGS. 2 and 3, showing the airsleeve being cured by the expanded bladder within the curing chamber.
Figure 5:
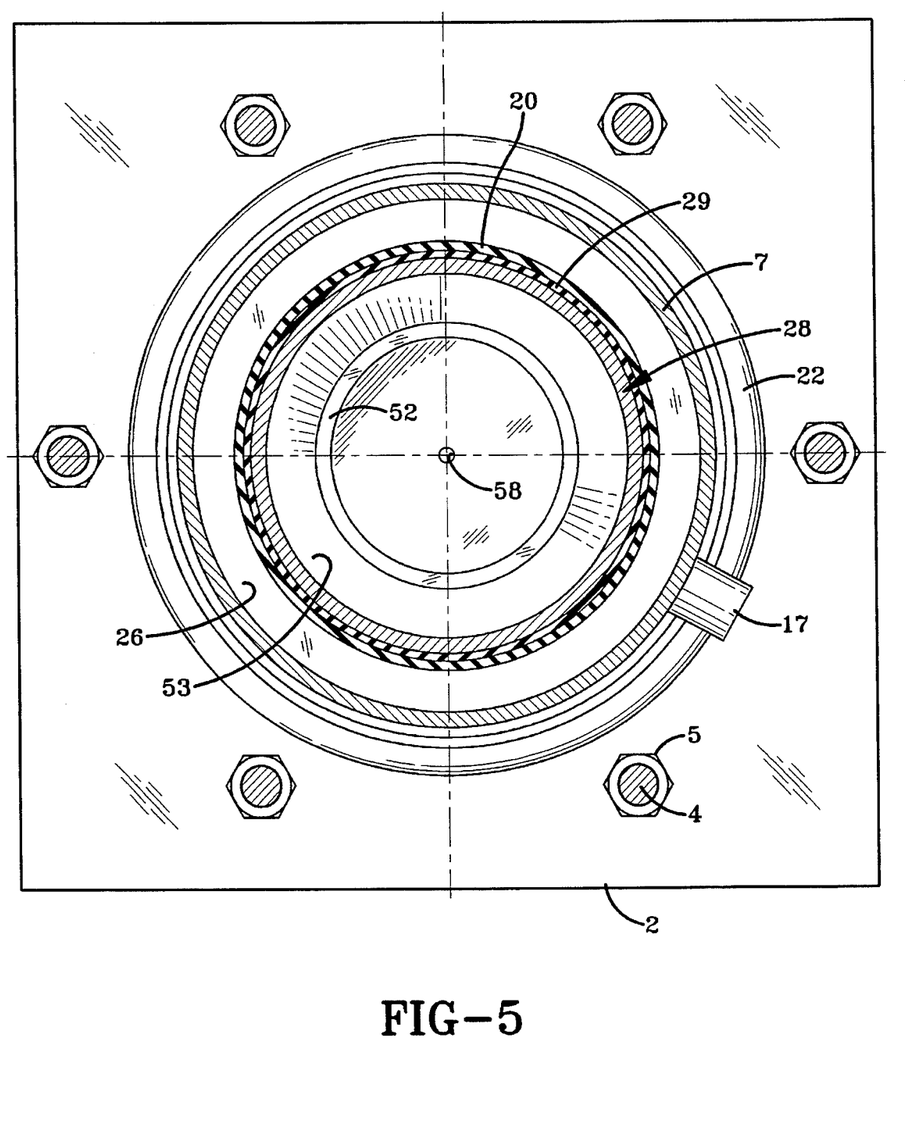
FIG. 5 is an enlarged sectional view taken on line 5—5, FIG. 4.
Figures 6, 7, 8:
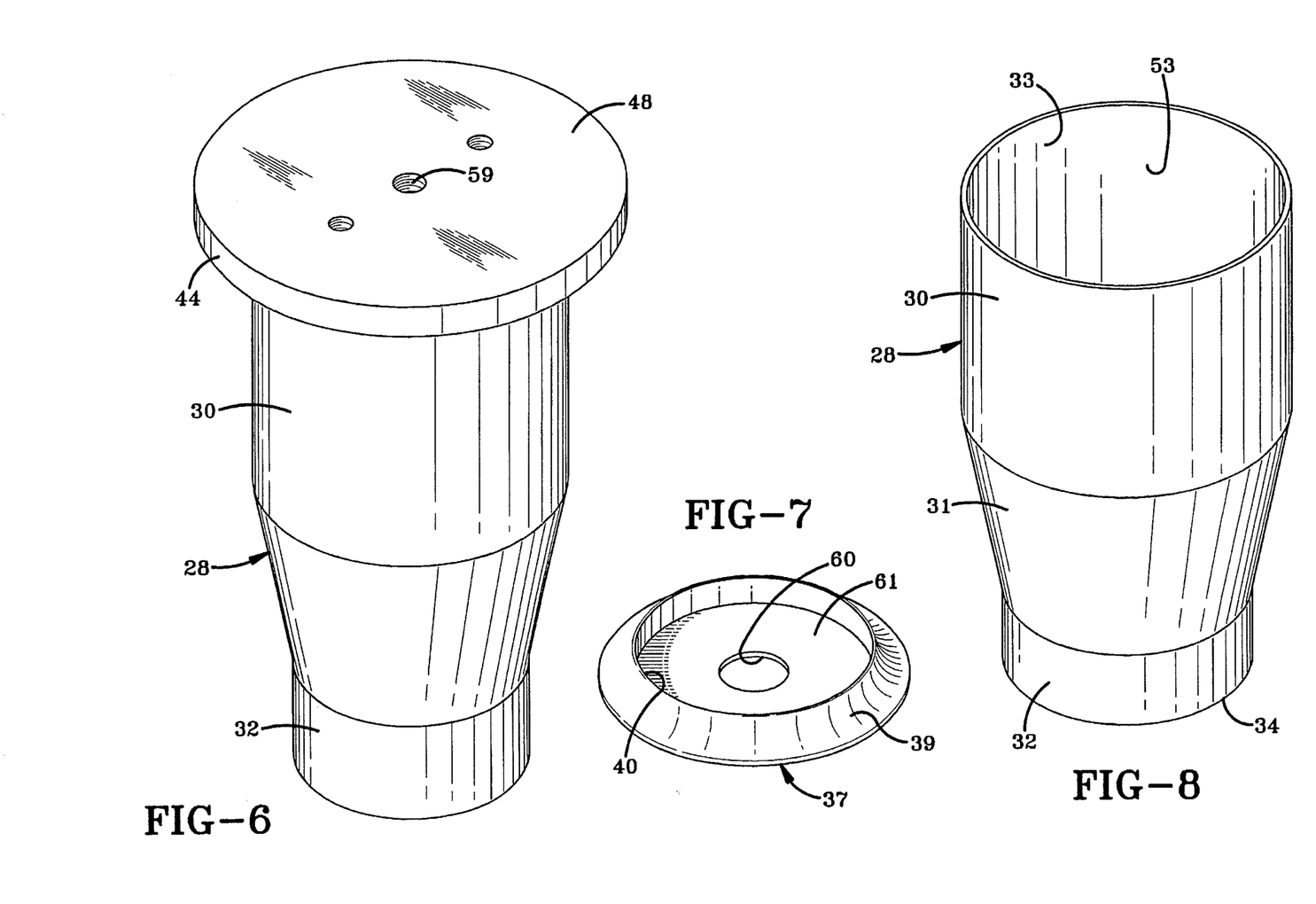
FIG. 6 is a perspective view of the tapered sleeve cartridge and top end plate removed from the curing press.
FIG. 7 is a perspective view of the bottom bladder radius fixture removed from the cure press.
FIG. 8 is a perspective view of the tapered sleeve cartridge of the curing press.

A bottom radius fixture 37 shown particularly in FIG. 7, is seated within an annular recess 38 (FIGS. 2–4) formed in bottom plate 2, and has an annular concave sidewall 39 to provide a smooth curved area to prevent pinching of bladder 20 when expanded outwardly as shown in FIG. 4. The bottom open end 34 of sleeve cartridge 28, is seated within a hollow interior 40 of radius fixture 37 as shown in FIGS. 2 and 4, to firmly fix the lower end of the cartridge within a curing chamber 40 which is formed between the outer surface of cartridge 28 and the interior surface of bladder 20.

A top radius fixture 42 (FIGS. 2–4) is slidably mounted on the top cylindrical portion 30 of cartridge 28, and has an annular concave sidewall 43 which provides a smooth surface to prevent pinching of the bladder when it is expanded outwardly as shown in FIG. 4, in a similar manner as does concave sidewall 39 of bottom radius fixture 37. Top fixture 42 includes an outer annular flange 44 which seats into a complementary shaped annular shoulder 45 formed in top plate 3 which defines a central opening 46 of plate 3.

A disc-shaped top closure plate 48 is formed with an annular central boss 49, which is telescopically slip-fitted into top open end 33 of cartridge 28 for sealing the open end thereof, which in combination with a bottom sealing plate 50 which is telescopically inserted into open bottom end 34 of cartridge 28 and seated against an annular interior flange 52 thereof, provides for a sealed hollow interior 53 of cartridge 28.

A top safety closure bar 55 clamps top closure plate 48 in position within the open end of cartridge 28 and against shoulder 45 of top plate 3 by adjusting nuts 56 which are mounted on the threaded ends of at least a pair of the strain rods 4, as shown particularly in FIGS. 1 and 4.

A fluid outlet port 58 is formed in bottom sealing plate 50 and a fluid inlet port 59 is formed in top closure plate 48 for discharging and emitting a heated fluid of steam and air into hollow interior 53 of cartridge 28 for heating the cartridge to assist in curing uncured airsleeve 29 when placed thereon.

Outlet port 58 will extend through an aligned opening 60 formed in the bottom wall 61 of bottom radius fixture 37 and through a tapered opening 64 formed in base place 2 enabling a quick connect fluid line (not shown) to be connected thereto. A quick connect fluid inlet fixture 65 (FIG. 1) is connected to fluid inlet port 59 and extends through a complementary shaped opening 66 formed in closure bar 55 for supplying a heated fluid into the interior of cartridge 28.

The method of the present invention and the manner of curing a tapered airsleeve is best illustrated in FIGS. 3 and 4. As shown in FIG. 3, closure bar 55 and top closure plate 48 are removed from their closure contact with top plate 3 by removal of certain nuts 5. Cartridge 28 is removed from within curing chamber 40 and a preshaped uncured green airsleeve 29 is slidably mounted over the exterior surface of cartridge 28 which is shown partially accomplished in FIG. 3. After sleeve 29 has been mounted on cartridge 28 wherein it will closely match the contour of the cartridge, the cartridge and uncured sleeve will be inserted into curing chamber 40 through center opening 46 of top plate 3. Top radius fixture 42 will seat within shoulder 45 of top plate 3 and is securely clamped therein by top closure plate 48 and closure bar 55 to a position as shown in FIG. 4.

Next, a heated fluid, preferably a mixture of steam and air, is supplied from a remote source (not shown) through quick connect 16 into expansion chamber 26 expanding cylindrical bladder 20 generally radially outwardly to the position as shown in FIG. 4 wherein it presses sleeve 29 tightly against cartridge 28. The pressure exerted by bladder 20 together with the heated steam/air mixture fed into hollow interior 53 of cartridge 28 through fluid inlet port 59 and the heated fluid within expansion chamber 26, will cure sleeve 29 imparting the final set tapered configuration thereto, which conforms to the exterior surface of cartridge 28. After a predetermined curing temperature is maintained for a predetermined period of time to sufficiently cure airsleeve 29, the steam pressure is released on both internal mandrel 35 and external bladder chamber 24. A vacuum is applied to bladder chamber 24 drawing the curing bladder away from cured sleeve 29, closure bar 55 and closure plate 48 are removed to a position such as shown in FIG. 3, enabling cartridge 28 and cured sleeve 29 to be completely removed from within curing chamber 40. Cured sleeve 29 then is stripped away from cartridge 28 which then can be refitted with another uncured airsleeve 29, for subsequent placement within the curing chamber in a similar manner as discussed above.

In accordance with one of the main features of the invention, specially contoured and configured sleeve cartridge 28 can be used for the production of a considerable number of cured airsleeves 29, with the more readily replaceable element, namely bladder 20, being formed of a simple inexpensive cylindrical configuration, as opposed to the heretofore specially contoured bladders required for making tapered airsleeves. Likewise, upper and lower bladder radius rings 8 and 9, in combination with the outturned bladder ends 22, provide for a satisfactory fluid tight seal for bladder 20 between bottom and top plates 2 and 3, without pinching and damaging the out-turned ends.

Furthermore, the use of bottom and top radius fixtures 37 and 42 respectively, reduce the possibility of harmful pinchpoints developing on the bladder as it is expanded outwardly into pressure contact with the outer surface of cartridge 28 which would occur if a right-angled corner were formed between the upper and lower cylindrical wall portions of cartridge 28 and bottom and top plates 2 and 3. The fluid inlet and outlet lines (not shown) can remain attached to the various inlet and outlet ports of press 1 during the removal and insertion of airsleeves 29, again reducing the number of manual operations that must be performed when curing an airsleeve within press 1. These lines may incorporate quick disconnects or be manifolded for the vacuum/steam pressure cycles.

Accordingly, the tapered airsleeve of the present invention is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved tapered airsleeve is constructed and used, the characteristics of the construction, and the advantageous, new and useful results obtained; the new and useful structures, devices, elements, arrangements, parts and combinations and method steps, are set forth in the appended claims.

We claim:

1. An apparatus for curing a tapered elastomeric airsleeve including:

a) a top plate and a base;

b) a hollow support tube having top and bottom opposite open ends mounted between the top plate and base;

c) a cylindrical elastomeric bladder mounted inside said tube with corresponding top and bottom open ends forming an annular expansion chamber between said bladder and said tube;

d) means for sealing the open ends of the bladder with respect to the top plate and base to form a separate internal curing chamber within the expansion chamber;

e) a sleeve cartridge having a tapered outer contour with a cylindrical wall portion and an inwardly tapered wall portion located within the curing chamber for slidably receiving a similarly contoured preshaped elastomeric airsleeve thereon; and f) means for introducing a heated fluid into the expansion chamber to expand the bladder generally radially inwardly toward the sleeve cartridge to conform and cure the tapered airsleeve against the contour of said sleeve cartridge.

2. The apparatus defined in claim 1 in which the support tube is cylindrical and conforms generally to the contour of the cylindrical elastomeric bladder when said bladder is in an unexpanded condition.

3. The apparatus defined in claim 1 in which a plurality of strain rods extend between the top plate and base for sealingly clamping said plate and base against the bladder sealing means.

4. The apparatus defined in claim 1 in which the sealing means includes an annular radius ring mounted on each of the open ends of the support tube to prevent pinching of the bladder when sealed against the top plate and base.

5. The apparatus defined in claim 1 in which the sleeve cartridge has a hollow interior and has opposed ends; and in which a pair of radius bladder fixtures is located within the curing chamber adjacent the ends of the sleeve cartridge to prevent pinching of the bladder when it is expanded into contact with the sleeve cartridge.

6. The apparatus defined in claim 5 in which one of the radius fixtures is an annular ring mounted on the base and is formed with a concave cylindrical wall for engaging the bladder when the bladder is in the expanded position; and in which one of the ends of the sleeve cartridge is open and is telescopically received within the cylindrical wall of said one radius fixture.

7. The apparatus defined in claim 1 in which the sleeve cartridge has a pair of open ends; and in which an end plate encloses one of said open ends and is formed with a fluid port for emitting or discharging a heated fluid into and out of the hollow interior of the cartridge to assist in curing the preshaped elastomeric airsleeve.

8. The apparatus defined in claim 7, in which an other end plate encloses the other open end of the cartridge and is formed with a fluid port for emitting or discharging a heated fluid into and out of the hollow interior of the cartridge to assist in curing the preshaped elastomeric airsleeve mounted thereon.

9. The apparatus defined in claim 7, in which said end plate is formed with an annular outer flange which seats within the said one open end of the cartridge; and in which a closure bar secures said one end plate against the cartridge.

* * * * *